3,254,021
REGENERATION OF HYDROCRACKING CATALYST WITH HYDROGEN AND AN AROMATIC CONTAINING HYDROCARBON OIL
Ralph Burgess Mason, Denham Springs, and Robert Charles Paule, Baton Rouge, La., assignors to Esso Research and Engineering Company, a corporation of Delaware
No Drawing. Filed Aug. 23, 1963, Ser. No. 304,242
23 Claims. (Cl. 208—111)

This invention relates to a process for regenerating hydrocracking catalyst comprising a crystalline aluminosilicate zeolite composited with a platinum group metal. Particularly, it relates to a process for hydrocracking hydrocarbons in the presence of added hydrogen and a catalyst comprising a crystalline alumino-silicate zeolite composited with a platinum group metal, which process includes maintenance of catalytic activity by periodic treatment with hydrogen and a suitable hydrocarbon fraction, followed by treatment with hydrogen alone. More particularly, it relates to the regeneration of said catalyst subsequent to deactivation with high boiling, high nitrogen feeds.

Hydrocracking has recently become a subject of considerable interest in the petroleum industry because of certain particularized advantages that it offers over conventional catalytic cracking operations. Chemically, hydrocracking may be considered as a combination of hydrogenation and catalytic cracking; it being effected in the presence of a suitable bifunctional catalyst which simultaneously cracks high boiling hydrocarbons to lower boiling fractions and hydrogenates olefinic and aromatic materials into saturated paraffins and naphthenes. Among the advantages of hydrocracking over catalytic cracking are its ability to selectively convert refractive heavy aromatics to high quality naphtha or middle distillate with significantly less gas and coke yield and higher quality liquid products, and the adjustability of hydrocracking selectivity to produce a wide range of liquid products, e.g. gasoline, middle distillate, etc.

Generally, hydrocracking finds its highest degree of utility in the cracking of hydrocarbons boiling in the heavy naphtha and gas oil range. It has however met with only limited acceptance in the upgrading of heavy hydrocarbon oils, particularly low grade heavy hydrocarbon oils such as petroleum residues, shale oil, sour crudes, bitumen deposits, etc., due to the contamination and deactivation of the hydrocracking catalyst by various sulfur, nitrogen and metal-containing organic compounds present in such oils, which materials, in addition to acting as catalyst poisons, tend to deposit coke during the hydrocracking operation. Throughout this specification the term "coke" is intended to include a wide variety of polymeric materials of condensed ring aromatic origin, which materials are characterized by relatively low hydrogen to carbon ratios and are substantially insoluble in the feed stock at hydrocracking temperature.

Recently, a markedly superior hydrocracking catalyst has been used extensively for the hydrocracking of a variety of feed stocks. This catalyst comprises a platinum group metal deposited on, composited with, or incorporated within a crystalline alumino-silicate zeolite. Prior to the discovery of this hydrocracking catalyst, various conventional catalysts, such as the noble metals, or oxides or sulfides of iron group metals, supported on amorphous material such as silica, silica-alumina, etc., had been found to be extremely sensitive to the presence of feed impurities, and especially to organic nitrogen compounds. Under such conditions these conventional catalysts exhibited low activity and additionally required either frequent regenerations or the use of non-optimum reaction conditions which were not capable of producing maximum yield and quality of desired product. With the advent of the aforementioned platinum group metal on crystalline zeolite hydrocracking catalyst, the various difficulties experienced with the prior art catalysts were found to be substantially lessened in the hydrocracking of conventional feeds, e.g. feeds having nitrogen contents up to about 50 p.p.m. such as catalytic heating oil, coker gas oil, and low nitrogen crudes. Thus, excellent yields of lower boiling hydrocarbons, e.g. gasoline, were obtained with minimum coke-forming tendency, the required frequency of regenerations was substantially reduced, and relatively mild reaction conditions were utilizable without extensive feed pretreatment, e.g. removal of nitrogen, as was usually required prior to contact with the conventional catalysts.

However, although the development of this new type of catalyst has provided a marked improvement in the hydrocracking of conventional feed stocks, the hydrocracking of feed stocks containing appreciable quantities of nitrogen, e.g. over 50 and especially over 500 p.p.m. nitrogen, such as the aforementioned heavy petroleum feeds, e.g. residual oils and the like, has still proved not entirely satisfactory. It has been found, for example, that with certain of the crystalline zeolite catalysts containing platinum group metal, there are definite limitations with regard to the type of feed which can be successfully hydrocracked. For example, when a heavy nitrogen-containing petroleum oil containing a large proportion of contaminating materials is subjected to hydrocracking using a crystalline zeolite catalyst, the soluble metals which usually accumulate in the high boiling portions of the feed, i.e. those portions boiling above about 1000° F., tend to be deposited on the catalyst, with the catalyst thereby becoming progressively deactivated as the hydrocracking process proceeds. More significantly, coke formation with such feeds is usually excessive and contributes heavily to the deactivating process.

In connection with the use of the aforementioned platinum group metal-containing crystalline alumino-silicate zeolite hydrocracking catalyst, it has also been recently discovered that catalytic activity may be temporarily restored by intermittent treatment with hydrogen at elevated temperature. However, while this regeneration technique has proved useful for conventional low nitrogen containing feeds, it has now been found that the high nitrogen-containing feeds, such as the aforementioned heavy petroleum feeds, tend to deposit deactivating coke-like impurities of such nature that the relatively simple hydrogen regeneration treatment is frequently rendered ineffective. Thus, hydrocracking of such high boiling feeds as residua, shale oil, bitumen deposits, etc., has been found to produce an excessive amount of coke deposition on the hydrocracking catalyst, thereby producing almost complete deactivation of the catalyst after relatively few hydrostripping regenerations. Consequently, a costly and time-consuming carbon burning regeneration step is required to remove the coke deposits from the catalyst prior to the hydrostripping regeneration step.

It is the purpose of the present invention to provide an improved regeneration procedure for hydrocracking catalyst comprising a platinum group metal deposited on or composited with a crystalline alumino-silicate zeolite. While the regeneration procedure of the present invention may be readily applied to "spent" catalyst which has been deactivated by contaminating materials derived from a variety of petroleum feed stocks, it will be particularly useful in conjunction with the hydrocracking of the aforementioned heavy petroleum feed stocks which contain high quantities of nitrogen-containing high boiling materials and which have a marked tendency to undergo coke formation under hydrocracking operating conditions.

In accordance with the present invention, an improved regeneration treatment has been developed which involves simultaneously treating the deactivated catalyst, at elevated temperature, with hydrogen and a hydrocarbon fraction having a defined boiling range and aromatic content, and subsequently contacting the thus-treated catalyst with hydrogen alone at elevated temperature. This two-step regeneration procedure has been found to substantially improve the degree of catalyst reactivation, as compared to hydrostripping alone or to treatment with the hydrocarbon fraction alone. A further advantage of this procedure resides in the simultaneous hydrocracking and conversion of the hydrocarbon fraction to valuable lower boiling products.

In a preferred embodiment of the present invention, a high nitrogen-containing hydrocarbon feed stock is hydrocracked in the presence of added hydrogen and a platinum group metal-containing, e.g. palladium-containing, crystalline alumino-silicate zeolite catalyst having pore openings of from about 6 to about 15 A., and most preferably having a silica to alumina molar ratio of from about 4 to 6; periodically interrupting the hydrocarbon feed flow when the catalytic activity falls below a desired level as evidenced by a decrease in the conversion to desired products; continuing the hydrogen flow while concurrently passing an aromatic hydrocarbon fraction over the partially deactivated catalyst for a sufficient period of time, e.g. about 0.25 to 200 hours, to at least partially restore catalyst activity; subsequently discontinuing the flow of the hydrocarbon fraction and treating the partially reactivated catalyst with hydrogen alone for a sufficient period of time, eg., 0.25 to 100 hours, to complete the reactivation process and attain the desired level of catalytic activity; and finally recontinuing the feed flow under the original hydrocracking operating conditions. A convenient means for accomplishing this procedure is to utilize a multiple reactor system so arranged that reactivation of one catalyst bed may be accomplished while hydrocracking is being performed in another reactor, thus obviating the need for a plant shutdown. It will usually be preferred to interrupt the hydrocarbon feed flow to the hydrocracking reactor at such time as the conversion to products boiling below about 430° F. falls to about 30%. However, conversion levels above or below this value may also be employed, depending upon the nature of the feed, products desired and economic considerations.

Hydrocracking prior to the regeneration procedure is accomplished in the presence of added hydrogen and crystalline zeolite catalyst at temperatures of from about 500° F. to about 850° F., preferably 600 to 775° F.; pressures of from about 200 to about 3000 p.s.i.g., preferably 500 to 2000 p.s.i.g.; liquid hourly space velocities of from about 0.2 to about 4, preferably 0.5 to 2, volumes of feed per volume of catalyst per hour; and hydrogen rates of from about 1000 to about 25,000 preferably 5000 to 15,000 s.c.f. per barrel of feed. The conversion, expressed as volume percent conversion to products boiling below about 430° F., will generally be maintained at about 30 to 80%, preferably 40 to 60%, although other levels may be employed. Any conventional type of reactor such as a fixed, moving, or fluidized bed reactor may be employed.

The regeneration procedure of the invention will now be described in further detail. Once the hydrocracking catalyst has become wholly or partially deactivated, it is contacted with a suitable hydrocarbon fraction in the presence of hydrogen, at a temperature of from about 300 to about 700° F., preferably 500 to 650° F.; a pressure of from about 200 to about 3000, preferably 500 to 2000 p.s.i.g.; and a space velocity of from about 0.2 to about 4, preferably 0.5 to 2 volumes of hydrocarbon fraction per volume of catalyst per hour. The inclusion of the hydrogen in conjunction with the hydrocarbon fraction serves to facilitate depolymerization of the coke-like materials and coke precursors deposited on the catalyst as well as to increase the hydrogen to carbon ratio in the reaction products which are thereby removed. The hydrogen flow rate during this treatment will generally be about 50 to about 5000, preferably 2000 to 4000, s.c.f. per cubic foot of catalyst per hour. The hydrocarbon fraction and hydrogen are preferably passed downwardly over the deactivated catalyst in concurrent flow where a fixed catalyst bed is employed.

The hydrocarbon fractions useful in the regeneration procedure will generally have a boiling range of about 400 to about 700° F., preferably 415 to 650° F., and an aromatics content of at least about 30 wt. percent, preferably 40 to 100 wt. percent, and most preferably 60 to 100 wt. percent. Examples of suitable solvents include naphthalene, methyl naphthalene, catalytic heating oils, aromatic extracts of catalytic heating oils, and other petroleum refinery streams of appreciable aromatic content. It has thus been found convenient to integrate the regeneration process with other conventional refinery operations by utilizing certain selected petroleum fractions produced therein. For example, the catalytic heating oil fraction formed in conventional catalytic cracking operations and having the desired boiling range and aromatic content may be utilized in the regeneration procedure of the present invention. Furthermore, the integrated hydrocracking and regeneration process herein contemplated can be rendered self-sustaining once equilibrium conditions have been attained, by separating and segregating the heating oil and/or light gas oil fractions from the hydrocracked product stream and subsequently utilizing such factions in the regeneration procedure.

Subsequent to the above treatment, the catalyst is stripped with hydrogen alone to further restore catalytic activity, either completely or to an acceptable activity level. The temperature required for the hydrogen treating technique will normally be dependent upon the boiling range and nitrogen content of the original feed. Usually, the operating conditions employed for the hydrogen stripping treatment will include temperatures of from about 500 to about 1000° F., preferably 600 to 800° F.; pressures of from about 0 to about 2000 p.s.i.g., preferably 500 to 1500 p.s.i.g.; typical treating times of from about 0.25 to about 100 hours; and hydrogen flow rates of from about 50 to about 5000, preferably 2000 to 4500, s.c.f. $H_2$/c.f. catalyst/hour.

The regeneration procedure of the present invention will be generally useful with a variety of hydrocarbon feed stocks having initial boiling points above about 430° F. and nitrogen contents over about 50 p.p.m. nitrogen. The heavy hydrocarbon oil feeds with which the regeneration procedure herein contemplated will be particularly useful will include crude oils, petroleum residues, shale oil, coal tar, bitumen deposits, and distillate fractions from various refinery operations. These oils will usually contain relatively high proportions of organic sulfur, nitrogen and metal compounds, although the metal content of the distillate fractions will be substantially reduced. Such heavy hydrocarbon oils to which the process of the invention is particularly adaptable will generally contain about 50 up to 40,000 p.p.m. nitrogen, and especially over about 500 p.p.m. nitrogen.

The hydrocracking catalyst utilized for the conversion of the aforementioned heavy hydrocarbon oils generally comprises a crystalline metallo alumino-silicate zeolite, well known in the art as a "molecular sieve," having a platinum group metal deposited thereon or composited therewith. These crystalline zeolites are characterized by their highly ordered crystalline structure and uniformly dimensioned pores, and have an alumino-silicate anionic cage structure wherein alumina and silica tetrahedra are intimately connected to each other so as to provide a large number of active sites, with the uniform pore openings facilitating entry of certain molecular structures.

Naturally-occurring large pore crystalline alumino-silicate zeolites may be exemplified by the minerals chabazite, analcite, erionite, faujasite and mordenite, all of which may be beneficially employed. Synthetically produced alumino-silicate zeolites having large pore diameters are also available and will be preferred in the present invention. In general, all crystalline alumino-silicate zeolites, in natural or synthetic form, contain a substantial portion, e.g. above about 10 wt. percent, of an alkali metal oxide, normally sodium oxide.

More specifically, the cracking components of the catalysts used in the present invention are crystalline alumino-silicate zeolites having effective pore openings of about 6 to about 15 Angstrom units, with a substantial portion of the alkali metal, e.g. sodium, having been replaced with a cation (either a metal cation or a hydrogen-containing cation, e.g. $NH_0+$) so as to reduce the alkali metal oxide, e.g. $Na_2O$, content to less than about 10 wt. percent and preferably to about 1 to 5 wt. percent (based on zeolite). The size of the pore openings is regarded as critical since smaller openings, e.g. 4 A., will not be large enough to allow entry of certain heavy hydrocarbon molecules such as branched chain paraffins, cyclic compounds, etc. Additionally, the crystalline nature of the catalyst is important, since it determines the uniformity of the pore openings.

The anhydrous form of the base-exchanged crystalline alumino-silicate zeolite prior to compositing with platinum group metal may be generally expressed in terms of moles by the formula:

$$0.9 \pm 0.2 Me_{2/n}O : Al_2O_3 : XSiO_2$$

wherein Me is selected from the group consisting of hydrogen and metal cations (so that the $Na_2O$ content is less than 10 wt. percent of the zeolite), $n$ is its valence and X is a number from 2.0 to 14, preferably 3 to 10 and most preferably 4 to 6. Crystalline zeolites having silica to alumina ratios of 4 to 6 have been found to be more active, selective and stable than zeolites having lower silica to alumina ratios. However, zeolites having silica to alumina ratios in the range of 2 to 4 have many useful applications, particularly when the sodium oxide is replaced by an alkaline earth oxide, e.g. MgO, CaO, etc.

The above-described base exchanged alumino-silicate zeolites serve as the supports for the platinum group metal. The final catalyst should contain at least about 0.25 wt. percent, most preferably at least about 1.0 wt. percent, noble metal based on the weight of the final catalyst. Preferred ranges will be about 0.25 to 5 wt. percent, more preferably about 0.5 to 3 wt. percent, and most preferably about 1 to 2 wt. percent.

The processes for synthetically producing the crystalline alumino-silicate zeolite component of the hydrocracking catalyst herein contemplated are well known in the art. They involve crystallization from reaction mixtures containing: $Al_2O_3$ as sodium aluminate, alumina sol and the like; $SiO_2$ as sodium silicate and/or silica gel and/or silica sol; and metal oxide as alkaline hydroxide, preferably sodium hydroxide, either free or in combination with the above components. Careful control is kept over the soda ($Na_2O$) concentration of the mixture, the proportions of silica to alumina and soda (metal oxide) to silica, the crystallization period, etc., to obtain the desired product. A typical procedure for producing crystalline zeolite having a silica to alumina mole ratio of about 3 to 10 is as follows:

Colloidal silica or silica hydrosol is mixed with a solution of sodium hydroxide and sodium aluminate at ambient temperatures to produce a reaction mixture having the following molar ratios of reactants:

| Reactants: | Mole ratio |
|---|---|
| $Na_2O/SiO_2$ | 0.28 to 0.45 |
| $SiO_2/Al_2O_3$ | 8 to 30 |
| $H_2O/Na_2O$ | 20 to 60 |

The reaction mixture may then be allowed to digest at ambient temperatures for periods of up to 40 hours or more, in order to aid crystallization, after which period it is heated at 180° to 250° F., e.g. 200° to 220° F., for a sufficient period to crystallize the product, e.g. up to 24 to 200 hours or more, typically 50 to 100 hours. The crystalline, metallo alumino-silicate is separated from the aqueous mother liquor by decantation or filtration and washed to recover a crystalline product.

The zeolite is then base-exchanged with a hydrogen-containing or metal cation to reduce the sodium content to below 10 wt. percent. Suitable metal cations include ions of metals in Groups I to VIII and rare earth metals, and preferably metals in Groups II, III, IV, V, VI–B, VII–B, VIII, and rare earth metals. Where a hydrogen-containing cation is used to replace the sodium, the "hydrogen" form of the zeolite is produced. A convenient method of preparing the "hydrogen" form is to subject the zeolite to base-exchange with an ammonium cation solution followed by controlling heating at elevated temperature, e.g. 600 to 1000° F., to drive off water and ammonia. Alternatively the "ammonium form" of the zeolite can be used.

The "hydrogen" form or the "ammonium" form of the zeolite is composited or impregnated with platinum group metal by means of a wet impregnation or a base exchange reaction, by treatment with a platinum or a palladium salt or an ammonium complex of these elements, e.g. ammonium chloroplatinate, palladium chloride, etc. For example, a suitable palladium catalyst may be prepared by simply slurrying the desired quantity of the "ammonium form" of the zeolite in water, subsequently adding an ammoniacal palladium solution having the desired quantity of palladium, and mixing the resulting slurry for a short period of time at ambient temperature. The catalyst is then preferably subjected to calcination at elevated temperatures, e.g. about 500° to 1000° F., in order to reduce the platinum group metal, at least in part, to its elemental state, as well as to drive off water to form the anhydrous zeolite.

The above-described catalyst is most preferably used in the "hydrogen" or "ammonium" form wherein the sodium content of the sieve has been reduced with either hydrogen ion or ammonium ion. However, under certain circumstances it may be desirable to replace the sodium by other elements such as cobalt, nickel, zinc, magnesium, calcium, cadmium, copper, or barium.

The process of the present invention may be more fully understood by reference to the following illustrative examples which are not intended to be limiting.

EXAMPLE 1

*Part A.—Preparation of hydrocracking catalyst containing 2.0 wt. percent palladium*

A crystalline alumino-silicate zeolite having a silica to alumina mole ratio of 5.3 to 1 was prepared by the following procedure. A slurry mixture of 1655 grams of commercial sodium aluminate containing 65 wt. percent $NaAlO_2$ and 5300 grams of sodium hydroxide (97% NaOH), contained in 37 pounds of water, was added with rapid stirring to 78.5 pounds of a commercially available colloidal silica sol containing 30 wt. percent silica ("Ludox" solution, supplied by E. I. du Pont de Nemours & Co., Inc.). Mixing was conducted at ambient temperature of 75° F. The total molar relative composition of the resultant reaction mixture was as follows:

$$27SiO_2 : 11Na_2O : 1Al_2O_3 : 366H_2O$$

The composite slurry was maintained at ambinet temperature in an open vessel, with stirring, for a digestion period of about five minutes, and then heated to 212° F. The reaction vessel was then sealed to eliminate evaporation loss, and maintained at 212° F. for a period of six days, which was the point of maximum crystallinity as determined by periodic sampling and analysis. After cooling, the crystalline slurry was filtered, washed with water, and oven dried at 275° F. A sample of the crystals was then calcined for four hours at 850° F. A chemical analysis of the anhydrous crystalline zeolite showed the following: 64.8 wt. percent $SiO_2$, 14.0 wt. percent $Na_2O$, and 20.9 wt. percent $Al_2O_3$; which corresponds to an approximate molar composition of about 1.1 $Na_2O:Al_2O_3:5.3SiO_2$. Five pounds of the above sodium alumino-silicate zeolite having a silica to alumina mole ratio of 5.3 to 1 was then added at room temperature to 7.5 gallons of a 19 wt. percent aqueous solution of ammonium chloride. The composite solution was stirred intermittently over about a 2-hour period at room temperature and the solids were then filtered. This ion-exchange procedure was repeated with fresh ammonium chloride solution five times at a temperature of about 150° F. After the final treatment the filter cake was water washed to substantially remove excess chloride ion.

The resulting ammonium form of the zeolite was separated by filtration and treated with a solution containing the ammonium complex of palladium chloride in an amount sufficient to produce a 2 wt. percent palladium catalyst. Specifically, 1702 cc. of an ammoniacal palladium solution having a palladium content of 0.0504 gram of palladium per cc. was added to a water slurry of the ammonium form of zeolite which contained 8193 grams of zeolite and had a solids content of 52.2 wt. percent. This was equivalent to about 0.4 cc. of palladium solution per gram of solids in the zeolite slurry. The composite mixture was stirred for 1 hour, filtered, water washed, dried in an oven at 212° F., and finally calcined at 1000° F.

*Part B.—Preparation of hydrocracking catalyst containing 0.5 wt. percent palladium*

A 0.5 wt. percent palladium catalyst was prepared by essentially the same procedure of Part A of this example, except that the ammoniacal palladium solution contained 0.0126 gram of palladium per cc., which corresponded to 0.1 cc. of palladium solution per gram of solids in the zeolite slurry.

The compositions of the catalysts prepared in Part A and Part B of this example are shown in the following table:

|  | 0.5 Weight Percent Palladium Catalyst | 2.0 Weight Percent Palladium Catalyst |
| --- | --- | --- |
| $Na_2O$ | 1.1 | 1.1 |
| $SiO_2$ | 74.7 | 73.5 |
| $Al_2O_3$ | 23.7 | 23.4 |
| Pd | 0.5 | 2.0 |
| Cl | 0.0 | 0.0 |
| Surface Area, $m^2$/gram | 707 | 581 |
| Pore Volume, cc./gram | 0.49 | 0.47 |
| Pore Diameter, A | 13 | 13 |

EXAMPLE 2.—HYDROCRACKING AND REGENERATION PROCESS

The above catalysts were used for the hydrocracking of a South Louisiana crude oil and a West Texas atmospheric residuum having the following specifications:

TABLE I.—FEED STOCK INSPECTIONS

| Feed | South Louisiana Crude | West Texas Atmospheric Residuum |
| --- | --- | --- |
| Gravity, °API | 38.4 | 19.7 |
| Sulfur, Wt., Percent | 0.14 | 2.0 |
| Total Nitrogen, p.p.m | 140 | 2,200 |
| Conradson Carbon, Percent | 0.8 | 5.2 |
| Vol. Percent 800° F.+ Fraction | 22 | 70 |
| Nitrogen Content of 800° F.+ Fraction | 600 | 2,600 |
| Distillation Distribution: | | |
| Initial to 430° F., Vol., Percent | 36.2 | 0.8 |
| 430 to 650° F., Vol., Percent | 29.2 | 13.4 |
| 650 to 900° F., Vol., Percent | 23.6 | 33.8 |
| 900° F.+, Vol., Percent | 11.0 | 52.0 |

*Part A.—South Louisiana crude oil; 0.5% palladium catalyst*

Hydrocracking was performed in a once-through fixed bed operation using the 0.5% palladium catalyst of Example 1, at a temperature of 500° F., a pressure of 1500 p.s.i.g., a space velocity of 1.6 volumes of feed per volume of catalyst per hour, and a hydrogen gas rate of about 6000 s.c.f./b. The initial conversion obtained was about 30% to products boiling below about 430° F. It was observed that the catalyst deactivation rate was rapid with a steady decrease in the conversion obtained. In an attempt to compensate for catalyst deactivation and to prolong catalyst activity, the temperature was slowly raised to a level of about 650° F. After a total of 295 hours of hydrocracking operation, during which time the temperature had been raised to 650° F., the conversion obtained was only about 4%. The feed flow was then discontinued and the hydrogen flow was maintained at a rate of about 2000 s.c.f. per cubic foot of catalyst per hour. Concurrently, a catalytic heating oil was passed downwardly over the deactivated catalyst at a space velocity of about 1 v./v./hr. This catalytic heating oil had an aromatics content of 40 wt. percent and a boiling range of about 430 to 650° F. The concurrent flow of hydrogen and catalytic heating oil was continued for a period of about 168 hours, during which period some cracking of the heating oil occurred. The temperature and pressure during the heating oil and hydrogen treatment step were 600° F. and 1500 p.s.i.g., respectively. The heating oil flow was then discontinued and the catalyst was stripped with hydrogen under essentially the same temperature and flow conditions for a period of 72 hours. This completed the reactivation of the catalyst and the South Louisiana crude feed was again passed over the catalyst at a temperature of 625° F., a pressure of 1500 p.s.i.g., a space velocity of 1 v./v./hr., and a hydrogen flow of about 6000 s.c.f. per barrel. The conversion of the crude oil to products boiling below 430° F was about 50%, thus demonstrating a remarkable degree of reactivation as shown by a 46% increased conversion at a 25° F. lower operating temperature.

*Part B.—South Louisiana crude oil; 2% palladium catalyst*

A hydrocracking and catalyst regeneration run similar to that of Part A was conducted, utilizing the same hydrocracking conditions and the 2% palladium catalyst of Example 1. After 295 hours of operation, the catalyst yielded about a 71% conversion to products boiling below about 430° F. at a temperature of 650° F. The feed was then discontinued and the catalyst was simultaneously treated with the catalytic heating oil and hydrogen, and then hydrogen stripped, following the same procedure as described in Part A of this example. Upon continuation of the feed a conversion of 83% at a temperature of 625° F. was observed.

EXAMPLE 3.—HYDROCRACKING AND REGENERATION; CAMPARISON OF REGENERATION TECHNIQUES

*Part A.—West Texas atmospheric residuum; 2% palladium catalyst; two-stage regeneration treatment*

The 2% palladium catalyst of Example 1 was utilized for the hydrocracking of the high nitrogen content West Texas atmospheric residuum feed following the general procedure of Example 2. The high nitrogen content of this feed is ordinarily considered to be too high for successful hydrocracking over prolonged periods of time. Over 278 hours of once-through fixed bed operation the temperature was increased to 710° F. At this temperature, a pressure of 1500 p.s.i.g., a space velocity of 1.0 v./v./hr., and a hydrogen gas rate of 15,000 s.c.f per barrel of feed, the catalyst was observed to be partially deactivated with the observed conversion being only 30% The feed was then discontinued and, following the procedure of Example 2, the catalyst was simultaneously treated with the same catalytic heating oil of Example 2 and hydrogen for a period of about 168 hours; and subsequently treated with hydrogen over a period of about 72 hours. The feed was then recontinued, and the conversion observed. The results of this operation are shown in the following table:

TABLE II.—HYDROCRACKING OF WEST TEXAS ATMOSPHERIC RESIDUUM WITH 2% PALLADIUM-ZEOLITE CATALYST

| Operation | Original hydrocracking | Hydrocracking after heating oil and hydrogen treatment |
|---|---|---|
| Catalyst age, hrs | 278 | 527 |
| Temperature, °F | 710 | 625 |
| Pressure, p.s.i.g | 1,500 | 1,500 |
| Feed rate, v./v./hr | 1.05 | 0.5 |
| Vol. percent conversion of 430° F.+ material | 30 | 50 |

As shown in the above table, a 20% increase in conversion was obtained after the regeneration of the catalyst, with a somewhat lower temperature and feed rate being employed after the regeneration treatment. On the baiss of comparable operating conditions of temperature, pressure and feed rate, the original conversion obtained before regeneration would be only 10% after 278 hours of operation, thus demonstrating a 40% increase in conversion after regeneration.

*Part B.—Hydrocracking West Texas atmospheric residuum; 2% palladium catalyst; hydrostripping regeneration treatment*

In order to demonstrate the beneficial effect of the two-step regeneration treatment of the invention as compared to hydrostripping treatment alone, a run similar to that of Part A of this example was performed, with a different charge of the same catalyst and the same feed. After the original hydrocracking step, the hydrogen flow was continued for a period of 20 hours at 750° F. The hydrocracking performance before and after the hydrogen stripping is shown in the following table:

TABLE III.—HYDROCRACKING OF WEST TEXAS ATMOSPHERIC RESIDUUM WITH 2% PALLADIUM-ZEOLITE CATALYST

| Operation | Original hydrocracking | Hydrocracking after H₂ stripping for 20 hours at 750° F. |
|---|---|---|
| Catalyst age, hrs. on feed | 556 | 575 |
| Temperature, °F | 750 | 750 |
| Pressure, p.s.i.g | 1,500 | 1,500 |
| Feed rate, v./v./hr | 0.63 | 0.67 |
| Vol. percent conversion of 430° F.+ material | 42 | 51 |

As shown in the above table, at a hydrocracking temperature of 750° F. only a 9% increase in conversion was obtained by hydrostripping alone, whereas a 20% increase is shown in Table II at 625° F. On a comparable basis, at the 625° F. temperature level of Part A of this example, this 9% conversion at 750° F. corresponds to only about 1 to 3%.

The above examples clearly demonstrate the improved degree of catalyst reactivation obtained by the process of the present invention.

What is claimed is:

1. A process for regenerating a catalyst which has become at least partially deactivated during a hydrocracking process, said catalyst comprising a crystalline alumino-silicate zeolite composited with a platinum group metal, said zeolite having pore openings of about 6 to about 15 Angstrom units and containing less than about 10 wt. percent alkali metal oxide; which process comprises contacting said catalyst, at elevated temperature, with hydrogen and a hydrocarbon fraction having a boiling range of about 400° F. to about 700° F. and an aromatics content of at least about 30 wt. percent; and subsequently contacting said catalyst with hydrogen alone at elevated temperature.

2. The process of claim 1, wherein said catalyst contains at least about 0.25 wt. percent platinum group metal.

3. The process of claim 1, wherein said catalyst is initially contacted with about 50 to about 5000 s.c.f. of hydrogen per cubic foot of catalyst per hour and about 0.2 to about 4 volumes of said hydrocarbon fraction per volume of catalyst per hour, at a temperature of about 300 to 700° F.; and is subsequently contacted with 50 to 5000 s.c.f. hydrogen per cubic foot of catalyst per hour at a temperature of about 500 to 1000° F.

4. In a process for hydrocracking a hydrocarbon feed stock in the presence of added hydrogen and a catalyst comprising a crystalline alumino-silicate zeolite composited with a platinum group metal, said zeolite having pore openings of about 6 to about 15 Angstrom units and containing less than about 10 wt. percent alkali metal oxide; the improvement which comprises periodically contacting said catalyst when it has become at least partially deactivated in said process, at elevated temperature, with hydrogen and a hydrocarbon fraction having a boiling range of about 400° F. to about 700° F. and an aromatics content of at least about 30 wt. percent; and subsequently contacting said catalyst with hydrogen alone at elevated temperature.

5. The improvement of claim 4, wherein said catalyst contains at least about 0.25 wt. percent platinum group metal.

6. The improvement of claim 4, wherein said catalyst is initially contacted with about 50 to about 5000 s.c.f. of hydrogen per cubic foot of catalyst per hour and about 0.2 to about 4 volumes of said hydrocarbon fraction per volume of catalyst per hour, at a temperature of about 300 to 700° F.; and is subsequently contacted with 50 to 5000 s.c.f. hydrogen per cubic foot of catalyst per hour at a temperature of about 500 to 1000° F.

7. The improvement of claim 4, wherein said platinum group metal is palladium.

8. The improvement of claim 4, wherein said hydrocarbon feed stock contains more than about 50 p.p.m. nitrogen.

9. The improvement of claim 4, wherein said hydrocarbon feed stock contains more than about 500 p.p.m. nitrogen.

10. An improved process for hydrocracking a high nitrogen hydrocarbon feed stock which comprises:
(1) contacting said hydrocarbon feed stock with a catalyst comprising a crystalline alumino-silicate zeolite composited with a platinum group metal, said zeolite having pore openings of about 6 to 15 Angstrom units and containing less than about 10 wt. percent alkali metal oxide, in the presence of added hydrogen and under hydrocracking conditions of temperature and pressure, for a sufficient period of time to at least partially deactivate said catalyst;
(2) periodically interrupting contact between said hydrocarbon feed stock and said catalyst while continuing contact with hydrogen and concurrently contacting said catalyst with a hydrocarbon fraction having a boiling range of about 400° to 700° F. and an aromatic content of at least about 30 wt. percent, at elevated temperature, for a sufficient period of time to at least partially reactivate said catalyst;
(3) subsequently discontinuing the flow of said hydrocarbon fraction while maintaining contact between said catalyst and hydrogen at elevated temperature for a sufficient period of time to further restore catalytic activity; and (4) thereafter recontinuing contact between said catalyst and said hydrocarbon feed stock under the original hydrocracking conditions.

11. The process of claim 10, wherein said catalyst contains at least about 0.25 wt. percent platinum group metal.

12. The process of claim 11, wherein said platinum group metal is palladium.

13. The process of claim 10, wherein said hydrocarbon feed stock contains more than about 500 p.p.m. nitrogen.

14. The process of claim 10, wherein step (2) is performed at a temperature of about 300 to 700° F and step (3) is performed at a temperature of about 500 to 1000° F.

15. An improved process for hydrocracking a hydrocarbon feed stock having an initial boiling point above about 430° F. and containing more than about 50 p.p.m. nitrogen, which process comprises:
- (1) hydrocracking said hydrocarbon feed stock by contact with a catalyst comprising a crystalline alumino-silicate zeolite composited with a platinum group metal, said zeolite having pore openings of about 6 to 15 Angstrom units and containing less than about 10 wt. percent $Na_2O$, in the presence of from about 1000 to about 25,000 s.c.f. of added hydrogen per barrel of hydrocarbon feed, at a temperature of from about 500° F. to about 850° F., a pressure of from about 200 to about 3000 p.s.i.g., and a liquid hourly space velocity of from about 0.2 to about 4 volumes of feed per volume of catalyst per hour, for a sufficient period of time to at least partially deactivate said catalyst;
- (2) periodically interrupting contact between said hydrocarbon feed stock and said catalyst while continuing contact with hydrogen and concurrently contacting said catalyst with a hydrocarbon fraction having a boiling range of about 400° to 700° F. and an aromatic content of at least about 30 wt. percent, at a temperature of from about 300° F. to about 700° F., a pressure of from about 200 to about 3000 p.s.i.g., a space velocity of from about 0.2 to about 4 volumes of said hydrocarbon fraction per volume of catalyst per hour, and a hydrogen rate of from about 50 to about 5000 s.c.f. per cubic foot of catalyst per hour, for a sufficient period of time within the range of about 0.25 to 200 hours to at least partially reactive said catalyst;
- (3) subsequently discontinuing contact between said hydrocarbon fraction and said catalyst while maintaining contact between said catalyst and hydrogen at a temperature of from about 500 to about 1000° F., a pressure of from about 0 to about 2000 p.s.i.g., and a hydrogen flow rate of from about 50 to about 5000 s.c.f. per cubic foot of catalyst per hour, for a sufficient period of time within the range of about 0.25 to 100 hours to further restore catalytic activity; and
- (4) thereafter recontinuing contact between said catalyst and said hydrocarbon feed stock under the original hydrocracking conditions of step (1).

16. The process of claim 15, wherein said catalyst contains at least about 0.25 wt. percent platinum group metal.

17. The process of claim 15, wherein said catalyst contains about 0.25 to 5 wt. percent palladium.

18. The process of claim 1, wherein said zeolite has a silica-to-alumina mole ratio of about 2 to 14.

19. The process of claim 2, wherein said zeolite has been exchanged with a hydrogen-containing cation.

20. The improvement of claim 4, wherein said zeolite has a silica-to-alumina mole ratio of about 3 to 10.

21. The process of claim 10, wherein said zeolite has a silica-to-alumina mole ratio of about 4 to 6.

22. The process of claim 15, wherein said zeolite has a silica-to-alumina mole ratio of about 4 to 6.

23. The process of claim 15, wherein said zeolite has been exchanged with a hydrogen-containing cation.

References Cited by the Examiner
UNITED STATES PATENTS

| | | | |
|---|---|---|---|
| 2,317,494 | 4/1943 | Thomas | 208—68 |
| 3,048,536 | 8/1962 | Coonradt et al. | 208—110 |
| 3,099,617 | 7/1963 | Tilleners | 208—112 |
| 3,119,763 | 1/1964 | Haas et al. | 208—110 |
| 3,132,090 | 5/1964 | Helfrey et al. | 208—110 |
| 3,158,563 | 11/1964 | Strecker | 208—111 |

DELBERT E. GANTZ, *Primary Examiner.*

ALPHONSO D. SULLIVAN, *Examiner.*

A. RIMENS, *Assistant Examiner.*